Sept. 29, 1959   J. R. FOCHT   2,906,011
MACHINE FOR ASSEMBLING A VALVE CORE, WASHER AND SPRING
Filed April 9, 1957   3 Sheets-Sheet 1

INVENTOR
JOHN R. FOCHT
BY
Cornelius Zabriskie
ATTORNEY

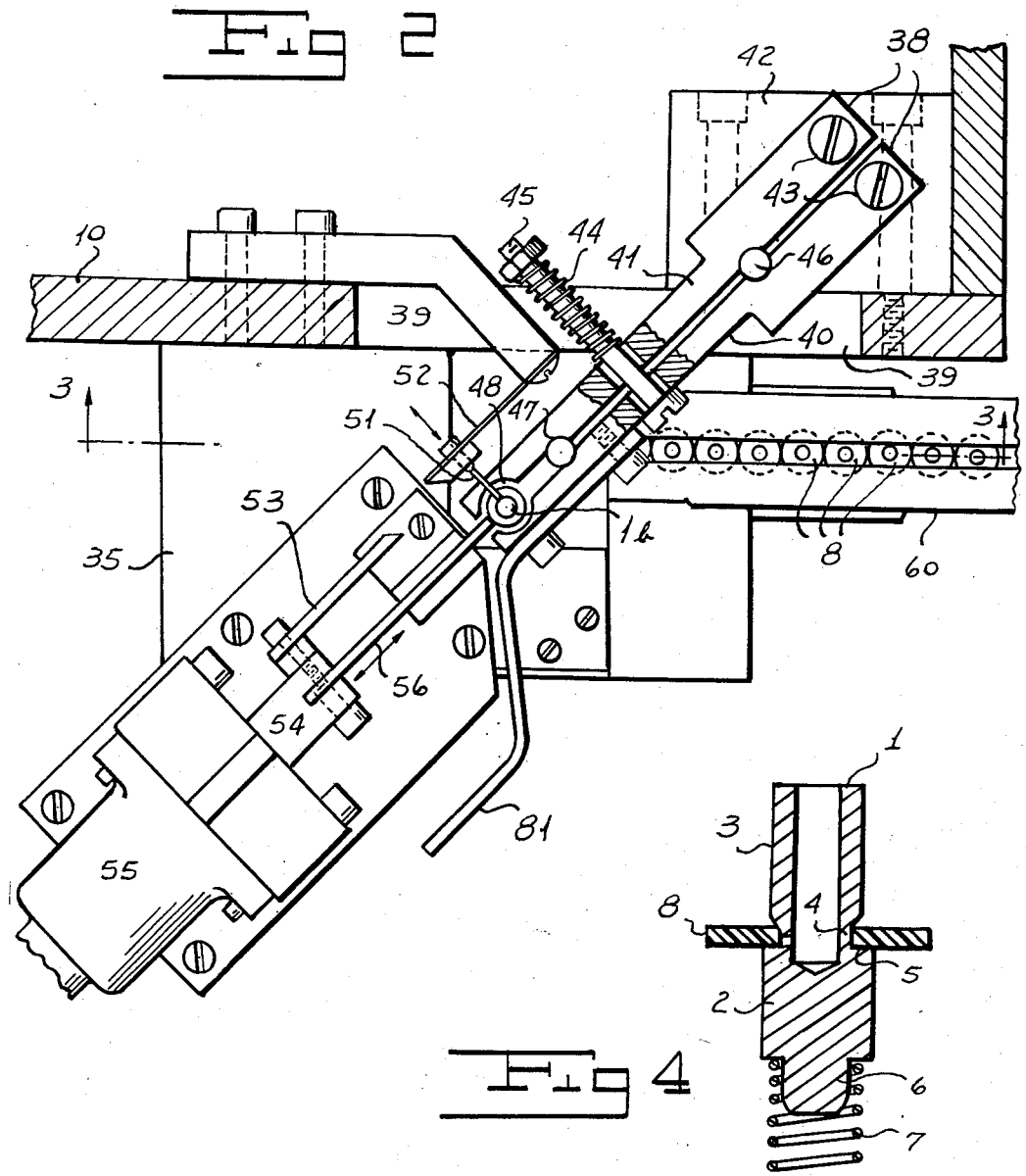

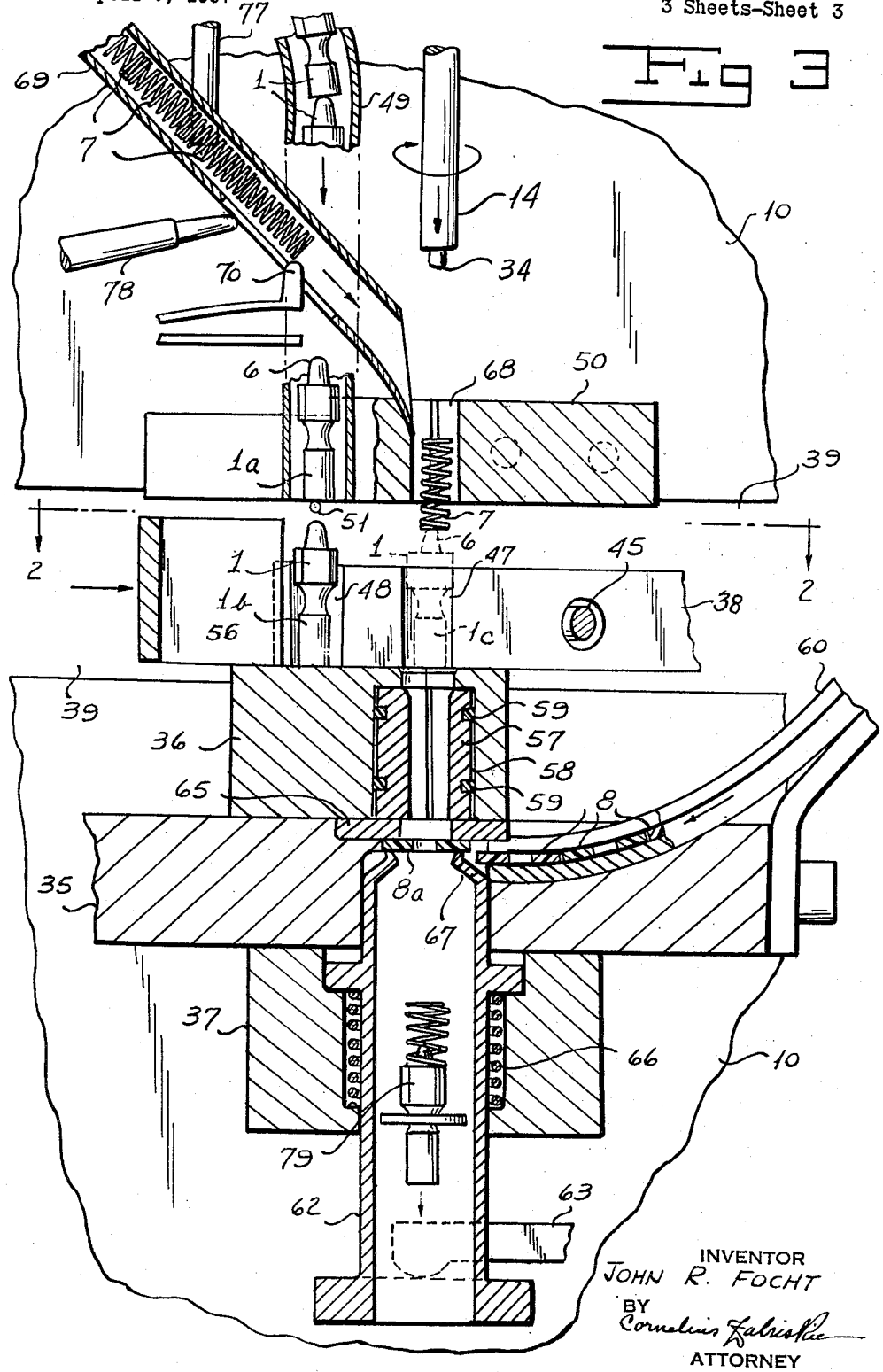

United States Patent Office 2,906,011
Patented Sept. 29, 1959

2,906,011

MACHINE FOR ASSEMBLING A VALVE CORE, WASHER AND SPRING

John R. Focht, Yonkers, N.Y., assignor to Precision Valve Corporation, Yonkers, N.Y., a corporation of New York Application April 9, 1957, Serial No. 651,723

12 Claims. (Cl. 29—211)

This invention is a machine for assembling valve cores, washers and springs to be subsequently handled as a unit in the dispensing of pressure packed materials and more particularly aerosols. Such an assembly is disclosed in Patent No. 2,631,814, issued March 17, 1953, to Robert H. Abplanalp.

The object of the invention is to provide apparatus for effecting this assembly at high speed so that a succession of these assemblies may be produced in an entirely automatic manner as one step in a production line.

The following detailed description sets forth numerous advantages of the invention and novel features thereof, whereby an extremely high rate of production is accomplished.

The accompanying drawings illustrate one practical embodiment of the invention, but the construction therein shown is to be understood as illustrative, only, and not as defining the limits of the invention.

Fig. 2 is a horizontal section on the line 2—2 of Figs. 1 and 3.

Fig. 3 is an enlarged vertical section in substantially the plane of the line 3—3 of Fig. 2, showing the lower portion of the machine of Fig. 1.

Fig. 4 is an enlarged view of the assembled core, washer and spring, accomplished through the operation of the machine shown in the preceding figures.

Figure 1:
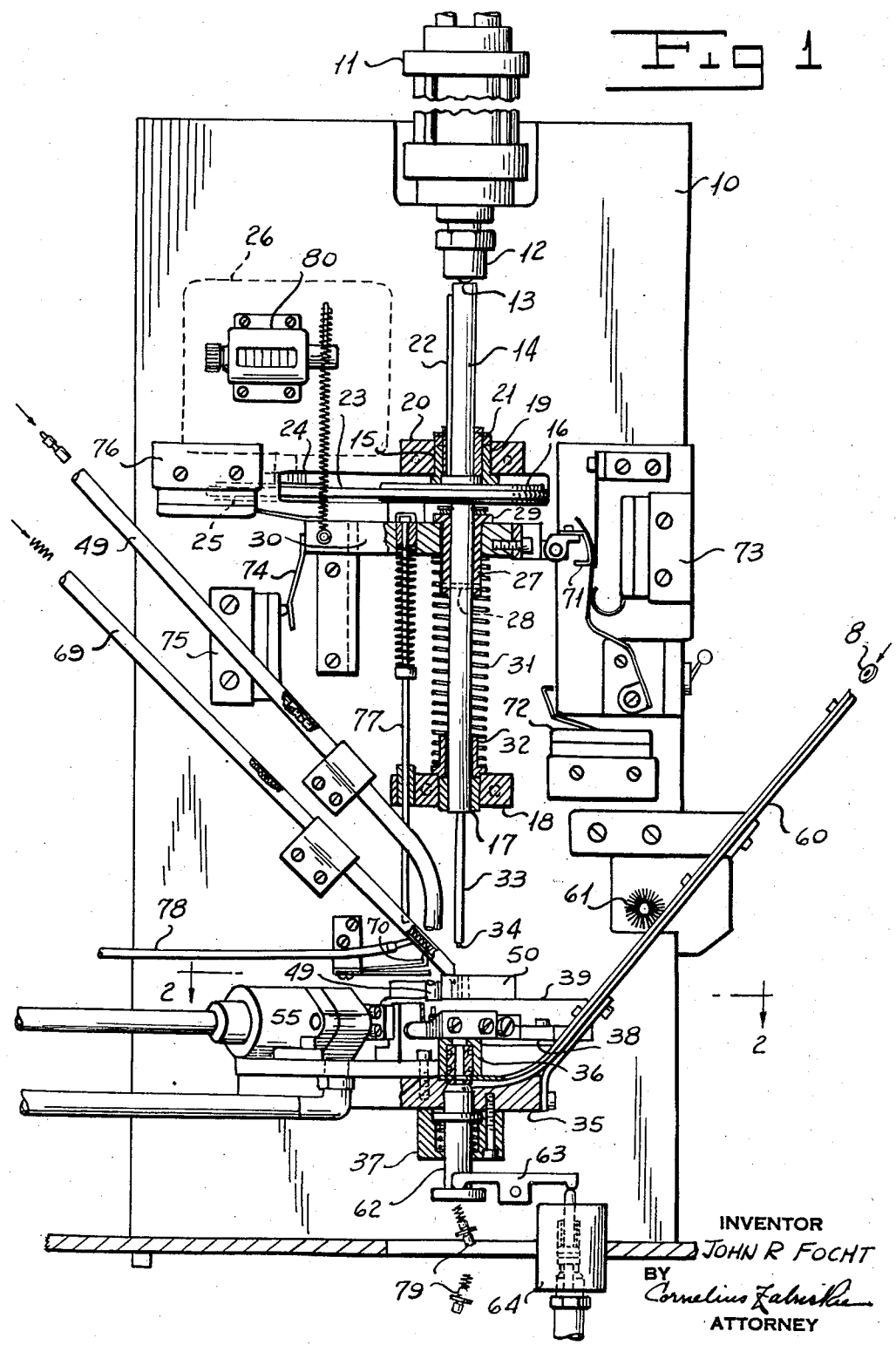
Fig. 1 is a front elevation of a machine embodying the present invention.

Fig. 3 of the drawings shows the assembly which it is the purpose of the machine of this invention to produce. That assembly comprises a valve core 1 having a body portion 2 and an upstanding stem 3. The stem is joined to the body portion 2 by a reduced neck 4, immediately below which is a shoulder 5. Said body portion 2 has a depending cylindrical projection 6 which is tightly embraced by a coil spring 7. An annular resilient washer 8 embraces the neck 4 and rests upon the shoulder 5.

The assembly shown in Fig. 3 forms an important part of the valve mechanism shown in the aforesaid Abplanalp patent. The purpose of the present invention is to provide a machine which will automatically place the washer 8 on the valve core 1 and attach the spring 7 to the projection 6. In aerosol valves these parts are at times very small and assembly by hand is a tedious, painstaking and slow procedure. The machine of this invention accomplishes this assembly in a rapid and efficient manner.

The machine shown in Figs. 1, 2 and 3 of the drawings comprises an upstanding supporting plate 10 which may be conveniently referred to as a back plate. This plate is rigid and is mounted in rigid position upon a suitable base. Rigidly secured to the upper part of the back plate 10 is an air motor 11 provided at its top with nipples for the connection of hoses through which compressed air or suction is communicated to the air motor.

Extending downwardly from said air motor is a plunger 12 adapted to be raised and lowered by said motor. This plunger carries a ball 13 at its lower end, which bears against the upper end of a vertical ram 14. This ram extends downwardly through the hub 15 of a pulley 16 and from thence downwardly through a bushing 17 fixed within a bracket 18 anchored to the back plate 10 and serving as a guide for the lower portion of the ram.

The hub of the pulley 16 extends through a bushing 19 which is journalled for rotation in a bracket 20 fixed to the back plate 10. The lower portion of this bushing has an external flange which bears against the under side of the bracket 20 and this bushing is anchored to the hub of the pulley by means of a split spring ring 21. The pulley is thus supported against axial movement, but the ram is provided with an elongated key 22 which extends downwardly through a keyway in the hub of the pulley 16, so that the pulley may serve to rotate the ram while permitting the ram to vertically reciprocate. A belt 23 extends around pulley 16, passes through an opening 24 in the back plate and embraces a pulley 25 fixed on the operating shaft of an electric motor 26, mounted on the back of the back plate. Through the operation of this motor, the ram 14 is constantly rotated.

Embracing the ram below the pulley 16 is a collar 27 locked to the ram by a pin 28. Loosely mounted on this collar but bearing against a flange 29 is a carrier block 30. This block is held against the flange 29 by a coil spring 31 which embraces the ram with the upper end of the spring bearing against the under side of said block and the lower end of the spring bearing on the flange of a loose collar 32 which rests on the lower bracket 18. The carrier block 30 is thus resiliently held against the flange 29, but will move up and down with the collar because the spring 31 will yield to permit this movement.

That portion of the ram which is at all times below the lower bearing bracket 18 is reduced as shown at 33 and its lower end terminates in a pin 34 of a size to enter into one end of the spring 7 (Fig. 4) which is to be assembled on valve core 1.

Positioned below the ram 14 and rigid with the back plate 10 is a horizontal assembly table 35. A stationary core restraining block 36 rests upon the upper surface of this table and a stationary washer restraining block 37 bears against the under side of said table.

Resting upon the upper surface of the core restraining block is a core clamp 38 (Fig. 2) arranged diagonally through an opening 38 in the back plate. This clamp embodies two jaws 40 and 41 which are pivotally secured to a bracket 42 by screws 43. A spring 44, coiled about a bolt 45 impels the jaws toward one another and into engagement with a spacing and centering pin 46.

The jaws 40 and 41 are provided with two seats formed by concavities in the adjacent faces of said jaws. One seat 47 is in axial alinement with the ram 14, while the other seat 48 is near the free ends of the jaws and is in axial alinement with the discharge end of a feed tube 49 through which inverted cores 1 are successively fed from any conventional vibratory feed hopper (not shown). The discharge end of this tube 49 is supported in a spring centering block 50 rigid with the back plate 10 and, as each core arrives at position 1a at this end of the tube its movement is arrested by a detent 51 (Figs. 2 and 3), supported on a leaf spring 52. The detent is adapted to be retracted in timed relation to the other parts of the machine by a tripper bar 53 (Fig. 2) supported on the operating stem 54 of an air motor 55, which also carries a pusher 56.

The air motor 55 is mounted on a plate on the assembly table 35 and its stem is moved in and out in proper timed relation. As it moves inwardly, the forward end of the pusher engages a core 1 in position 1b, in the seat 48 and pushes that core to the right in Figs. 2 and 3 until said core enters the seat 47 and assumes position 1c, wherein it is coaxial with the ram 14. It is gripped and held in this position by the pressure of the spring 44.

At about this time, the beveled end of the tripper bar 53 engages and retracts the detent 51 so that the next core in position 1a is released and descends to a position wherein it rests upon the upper edge of the pusher 56. When the pusher is next retracted by the air motor, this core drops into the seat 48 and is ready to be fed from position 1b to position 1c in the seat 47 by the next forward movement of the pusher. Meanwhile the detent 51 has arrested the next following core at position 1a in the feed tube 49. The normal spacing of the jaws is such as to maintain the cores in upstanding position in the seats into which they are fed, but the spring 44 permits said jaws to yield sufficiently to allow the cores to be fed from the seat 48 to the seat 47.

The seat 47 contains the core in the gripped position described wherein it is directly above the upper chamfered ends of a split bushing 57. This bushing is housed within an oversize counterbore 58 in the core restraining block 36 (Fig. 3), but the split bushing is embraced by tension springs or elastic bands 59 which normally contract the internal passage through the bushing to a diameter less than the greatest diameter of the core 1.

The washers 8 are successively fed into coaxial relation with the ram, below the split bushing 57, through a feed chute 60, being helped along by a rotating brush 61 (Fig. 1). As the foremost washer 8 nears the lower end of the split bushing 57, a clamping tube 62, which is also coaxial with the ram, is lowered by a lever 63, operated by an air motor 64, to permit said washer to move into position 8a between the upper end of said tube and a plate 65 (Fig. 3). As soon as it is in this position, the lever 63 releases said tube 62 and it is elevated by a spring 66, with the result that said washer is clamped between the upper end of the clamping tube and said plate. It will be noted from Fig. 3 that the upper end of the tube is contracted at 67 to thus clamp the washer, but leave a constricted opening of a diameter in excess of the greatest diameter of the core 1.

By the operations thus far described, a core in position 1c and a washer in position 8a are arranged in superimposed coaxial relation, and also coaxial with the ram 14. To effect the desired assembly it is necessary to bring a spring 7 into like relation with these parts. This is accomplished in the following manner.

The spring centering block 50 is provided with an upright passage 68 (Fig. 3) coaxial with the ram 14. Into one side of this passage a feed tube 69 leads from any appropriate vibrating feed hopper (not shown), so that springs 7 are fed by gravity through this feed tube to the passage 68. A detent 70 mounted on a leaf spring normally arrests the feed of springs through the tube.

The foregoing fundamental parts of the machine are operated in the following manner:

As the ram 14 reaches the bottom of its down stroke, a switch operating cam 71, pivotally mounted on the carrier block 30, engages the arm of a micro switch 72 which controls the admission of pneumatic pressure to the air motor 11, with the result that said motor is operated to retract its stem 12 and permit the spring 31 to elevate the ram. As it rises with the ram, the switch operating cam 71 acts upon the arms of a two position core feed switch 73 which controls the operation of the air motor 55, so that a core, in position 1b, is moved into position 1c. The switch 73 remains closed until the ram descends to free the cam from engagement with said switch.

As the ram approaches the upper end of its stroke a wiper 74 on the carrier block 30 operates the micro switch 75 which controls the air motor 64 and causes it to act on the lever 63 to depress the washer clamping tube 62, so that the foremost washer 8 is moved into position 8a (Fig. 3).

As the ram reaches the upper end of its stroke, the carrier block engages the operating arm of micro switch 76 which controls the down operation of the ram and causes said ram to descend. As the ram descends it first opens the switch 76 but the motor 11 continues to lower the ram until its operation is reversed by the up switch 72. The ram next opens switch 75 and the air motor 64 immediately releases the clamping tube 62 which then grips the washer in position 8a.

As the ram starts its downward movement, the switch operating cam 71 flips upwardly on its pivot into inverted position to disengage it from the operating arm of the core feed switch 72. When this occurs, said switch automatically reverses its internal contact and effects the energization of the air motor 55 in the opposite direction to retract the pusher 56 and permit the next core to drop into position 1b in seat 48.

In this manner a spring 7, which has already entered its seat 68, as hereinafter described, a core 1 and a washer 8 are brought into superimposed coaxial relation with one another and with the ram below the latter.

As the ram continues to descend, the pin 24 at the lower end of the ram enters the upper end of the spring 7 in seat 68, forces said spring downwardly onto the projection 6 of the underlying core 1, and forces the core, with spring attached, downwardly into the central opening of the underlying washer 8 until that washer reaches the neck 4 of the core, whereupon the parts, assembled as described, will be forced, as a unit, downwardly through the constricted opening in the upper end of the clamping tube 62, to fall through and be discharged therefrom as the finished assembly, indicated at 79.

During this assembly operation, the ram 14 is continuously rotated by the electric motor 26 in a direction of the helix of the spring 7 in order to more readily permit said spring to be forced over the projection 6 of the core.

As the ram approaches the bottom of its stroke, a push rod 77 on the carrier block 30 acts upon detent 70 to release the lowermost spring 7 in the feed tube 69. This spring then gravitates, with the aid of a compressed air blast constantly flowing from nozzles 78, into a position at the lower end of the feed tube 69 where it comes to rest in abutting relation with the ram. The ram maintains the spring in this position until said ram is again elevated to release the spring, which immediately falls into the seat 68 and drops into contact with the upper end of the projection 6 of the core in seat 47.

During the assembly operations described, the split bushing 57 offers sufficient resistance to the passage of the core to permit the forcing of the spring onto the projection 6 of the core. Similarly the resilient gripping of the washer in position 8a by the tube 62 holds the washer tightly until the core can be forced through the central opening of the washer until said washer seats against the shoulder 5, whereupon the ram forces the washer from its engagement with the tube 62. As a consequence, the assembled core, spring and washer are free to drop through said tube.

The part 80 shown in Fig. 1 is a counter connected by an operating spring to the carrier block to indicate the number of assemblies performed by the machine.

The machine of this invention is remarkably efficient in assembling the parts as described. The production is at the rate of several per second and the only manual requirement is that of keeping the vibratory feed hoppers for the several elements of the valve, supplied with such elements. It will be noted that the jaw 40 is provided with a handle 81, the purpose of which is to permit said jaw to be manually drawn away from the jaw 41 to clear out extraneous matter or dirt that may accumulate between said jaws.

The foregoing description sets forth the invention in its preferred practical form, but the invention is to be

Having thus fully described the invention, what I claim as new and desire to secure by Letters Patent is:

1. A valve assembling machine comprising: a single assembling ram and helical spring, core and washer seats all coaxial with one another and with the ram arranged in the order stated and normally beyond one end of the ram, means for feeding a spring, a core and a washer individually into their respective seats, means for driving said single assembling ram against the spring to force the spring into attached engagement with the core and the core with attached spring into attached engagement with the washer while the axis of said single assembling ram remains in fixed position, and a support on which all of the foregoing parts of the machine are mounted.

2. A valve assembling machine according to claim 1, comprising means for rotating the ram in a direction contra to the direction of the helix of the spring element.

3. A valve assembling machine according to claim 1, wherein the free end of the ram has an axial pin adapted to enter the adjacent end of the spring.

4. A valve assembling machine according to claim 1, wherein the seats for the core and washer comprise means for resiliently holding them in their respective seats until they are forced therefrom by the ram at the conclusion of the assembly.

5. A valve assembling machine according to claim 1, wherein the seat for the core is formed within a core clamp comprising a pair of pivoted clamping jaws spring pressed to normally impel them toward one another.

6. A valve assembling machine according to claim 5, wherein the jaws of the core clamp are provided with two seats one of which is coaxial with the ram while the other of which is coaxial with a feed tube for feeding a core into the latter seat, and means for forcing a core element from said latter seat into coaxial seat while the ram is in retracted position.

7. A valve assembly machine according to claim 6, wherein means for forcing said core from one seat to the other comprises a pusher.

8. A valve assembly machine according to claim 7, wherein the core is fed to the latter seat through a feed tube, in combination with means for controlling the feed of a plurality of cores one at a time into said latter seat, said latter means comprising a detent, and means operable with the pusher to retract the detent while the pusher is shifting a core from said latter seat to the coaxial seat.

9. A valve assembly machine according to claim 1, wherein the washer seat embodies a spring pressed clamping member with means for retracting said member to permit a washer to be fed to the seat and the clamping member then released to clamp the washer in coaxial relation with the ram.

10. A valve assembling machine according to claim 1, comprising means for individually feeding springs to the spring seat, means for controlling said feed to permit one spring at a time to be fed to the seat, and means operable with the ram for actuating the means for controlling the feed of said springs.

11. A machine for assembling an annular washer and a helical spring upon a core having a projection to tightly receive one end of the spring and a reduced neck to closely receive the opening of the washer, comprising: a ram mounted for vertical reciprocation on a fixed axis, means for rotating said ram continuously, a spring seat arranged below and coaxial with the ram, means for feeding springs individually into said seat, a core seat directly below the spring seat and coaxial with the ram, means for feeding cores into the core seat, means for resiliently holding the core in its seat, a washer seat below and coaxial with the core seat and comprising a clamping tube spring impelled in a directtion of the core seat with means to retract the clamping tube to permit the feed of washers individually into coaxial relation with the ram and to clamp the foremost washer when thus fed into coaxial position, means for forcing said ram against the spring in its seat to attach it to the core in its seat and to thereupon force the core with spring attached through the hole in the washer in its seat and thereupon force the complete assembly downwardly into the clamping tube below the washer seat, and a support on which all of the foregoing parts of the machine are mounted.

12. A machine for assembling a washer and helical spring, according to claim 11, wherein the core seat is formed in coacting jaws of a core clamp.

References Cited in the file of this patent

UNITED STATES PATENTS

| | | |
|---|---|---|
| 2,155,958 | Schmidt | Apr. 25, 1939 |
| 2,214,814 | Hambleton | Sept. 17, 1940 |
| 2,322,538 | Muther | June 22, 1943 |
| 2,324,925 | Hallowell | July 20, 1943 |
| 2,518,009 | Hess | Aug. 8, 1950 |
| 2,551,652 | Vreeland | May 8, 1951 |
| 2,604,692 | Broden | July 29, 1952 |